US006430106B1

(12) United States Patent
Staron

(10) Patent No.: US 6,430,106 B1
(45) Date of Patent: Aug. 6, 2002

(54) SEISMIC EXPLORATION DEVICE AND METHOD OF OPERATION THEREOF WITH REMOTE CONTROL PROCESSING OF SEISMIC SIGNALS PRODUCED BY INDIVIDUAL SEISMIC SENSORS

(75) Inventor: Philippe Staron, Mennecy (FR)

(73) Assignee: Institut Francais Du Petrole, Rueil-Malmaison (FR)

( * ) Notice: Subject to any disclaimer, the term of this patent is extended or adjusted under 35 U.S.C. 154(b) by 0 days.

(21) Appl. No.: 08/035,969

(22) Filed: Mar. 23, 1993

(30) Foreign Application Priority Data

Mar. 23, 1992 (FR) ............................................ 92 03576

(51) Int. Cl.$^7$ ................................................ G01V 1/00
(52) U.S. Cl. ....................................................... 367/77
(58) Field of Search .............................. 367/13, 22, 61, 367/62, 63, 76, 77; 340/853.3, 854.6, 854.7, 855.7

(56) References Cited

U.S. PATENT DOCUMENTS 2,874,356 A * 2/1959 Peterson ...................... 367/77
3,863,200 A    1/1975 Miller ......................... 367/77
4,639,901 A * 1/1987 Warmack et al. ............. 367/13
4,885,724 A * 12/1989 Read et al. ................... 367/77
4,896,152 A * 1/1990 Tiemann ................... 340/853.3

FOREIGN PATENT DOCUMENTS

EP        0 182 452        5/1986
EP        0 226 366        6/1987

* cited by examiner

Primary Examiner—Nelson Moskowitz
(74) Attorney, Agent, or Firm—Antonelli, Terry, Stout & Kraus, LLP

(57) ABSTRACT

A seismic signal reception device on land comprising a large number of sensors each associated with an adjusting means which may be remote-controlled from a central control and recording station, by means of seismic data acquisition boxes distributed in the field. It is possible to rapidly change at any time, from the central station, the number of sensors forming each seismic trace, the weighting coefficients of the various elementary signals constituting a trace and to control pre-processing of the signals picked-up before their transmission to the recording laboratory. By modeling the features of the reception device, interpretation of the recordings may be highly simplified.

22 Claims, 2 Drawing Sheets

SEISMIC EXPLORATION DEVICE AND METHOD OF OPERATION THEREOF WITH REMOTE CONTROL PROCESSING OF SEISMIC SIGNALS PRODUCED BY INDIVIDUAL SEISMIC SENSORS

BACKGROUND OF THE INVENTION

1. Field of the Invention

The present invention relates to a seismic exploration device whose configuration and/or features may be adapted or modelled according to particular conditions, and to a method for the implementing thereof.

2. Description of the Prior Art

Seismic exploration devices used for seismic prospecting generally comprise a reception device consisting of a very large number of seismic receivers which are placed in various locations of the explored zone for receiving the seismic waves reflected or refracted by the subsoil discontinuities, in response to vibrations transmitted into the ground by a seismic source. The receivers generally consist each of a combination of several elementary sensors (geophones, hydrophones) interconnected electrically and arranged in the explored zone so as to filter for example surface noises within the scope of seismic reflection prospecting runs. Each of these receivers provides a seismic "trace" which is an electric average of the signals produced by all the elementary sensors. The receivers may be distributed in the field or along a well, or arranged along a seismic streamer towed through the water by a ship. In modern reception devices, the groups of sensors are associated with signal acquisition boxes. Each box collects the signals delivered by one or several groups of sensors, to digitize, store and average several traces recorded successively. By order of a central control and recording station, each acquisition box transmits sequentially the stored traces to a recording device through one or several common communication channels (radio cables or channels). The lay-out of the various sensors of a single "seismic trace" has a considerable effect on the rejection of the surface noises. The sensors may be arranged at regular or unequal intervals in some cases to filter surface noises better without degrading useful signals. In onshore seismic prospecting, it is well-known to carry out "noise shootings" whose analysis allows the best relative arrangement of the sensors of a single trace to be defined.

These sensors may be associated with means for modifying the characteristics of the resultant signals, passive networks or local amplification modules to weight the sensors respective sensitivities or gains, active low-pass filters to attenuate undesirable frequency bands, etc. Various active or passive weighting processes are for example described in U.S. Pat. Nos. 2,698,927, 2,747,172, 3,400,783, 3,863,200, 3,863,201, etc.

An analog processor for modelling the frequency gain or spectrum of the various sensors allows a substantial attenuation of the noise level before the digitization of the useful signals in the acquisition boxes or in the central recording laboratory, and therefore make it possible to reserve the total dynamic range of the digitization circuit for processing these signals.

The major drawback of all analog pre-processing equipments lies in their rigid structure. The filtering parameters must be known in advance and, assuming that the reception device that is effectively set in the field allows these parameters to be changed, appropriate adaptations have to be carried out on the location of these local processors, which delays the recording operations. Moreover, the possible corrections which may be achieved before a "shooting" cannot be changed during recording.

Now, there are numerous cases, which will be shown in the description below, where trace adjustments and re-arrangements would be very useful adapting to the subsoil being explored and to obtain more readable seismic profiles. By extending the possibilities of existing recording laboratories, a solution could be considered to model a seismic reception device more easily. For example, if a 20- to 24-bit dynamic laboratory, capable of acquiring 500 to 4000 different channels (instead of the 12 to 15 bits currently obtained for the acquisition of 50 to 400 traces) was available, the analog filtering could be eliminated since it would be possible to acquire the signals of each of the elementary sensors distributed in the field with sufficient dynamic range. The optimum filtering of noise would be obtained from the recorded signals. However, the cost of such a laboratory with high dynamic range and a large number of traces, together with the cost of the processing of the large volume of data being obtained would be prohibitive.

SUMMARY OF THE INVENTION

The seismic exploration method according to the invention comprises installating, in a zone to be explored, an emission-reception device consisting of an array of receivers producing a set of seismic traces, a source of seismic signals and of at least one control and recording station. The invention is characterized in that each trace of at least part of the set of seismic traces is obtained through the combination of several seismic signals coming from several elementary sensors associated with control elements, and this combination may be modified at any time from the control and recording station by changing the combined elementary signals and/or by modifying the configuration of the elementary sensors going into the combination.

The method may comprise applying remote controls allowing for example:

differentiated control of the amplitude of the various signals constituting at least one of the traces, or application of selective phase shifts to the signals received by the sensors constituting at least one of the traces, or selection of the number of signals picked up constituting at least one of the traces, or a selected combination of signals received by the sensors of at least one of said traces, such as convolutional or recursive filterings for example, to be obtained, or inclusion of particular sensors in several adjacent seismic traces to be obtained.

The previous adjustments may be combined and also modified in time during the recording of a shooting for example.

Implementation of the method according to the invention allows the reception device to be configured at any time before each triggering of the seismic source or even during the reception of the seismic signals after the triggering of the source. The previous configuration, which are usual with reception systems of fixed configuration, are thus avoided or shortened. Various modifications or processings may be applied to the traces in real time during the recording sessions in the field without requiring a laboratory with extended processing capacity.

The seismic exploration device according to the invention comprises an array of seismic receivers producing a set of seismic traces, a source of seismic signals, and at least one control and recording station for collecting the seismic traces coming from the various receivers. It is characterized in that each receiver of at least one group of the array of receivers comprises a plurality of elementary seismic sensors associated with remotely controllable control elements, and means for combining the seismic signals resulting from the control elements, a remote control for remotely controlling the control elements so as to modify at will and at any time the configuration of the elementary sensors contituting each of the receivers and/or for modifying at least part of the elementary signals combined to produce each seismic trace coming from the group.

The device may comprise a assembly of acquisition apparatus distributed in the zone to be explored to collect each the signals of at least one seismic receiver, with at least one communication channel between the acquisition apparatus and the control and recording station for the transmission of control data and signals, and the remote control being connected to the remotely controllable control elements by means of the at least one communication channel and of conducting means arranged between them and the acquisition apparatus.

The control elements may for example comprise optoelectronic elements.

The conducting means reach for example the remotely controllable elements associated with arrays of sensors, the remote control means comprise means for coding to associate address words with control signals and the remotely controllable elements may also comprise address decoders. The conducting means comprise for example adjusting means.

The connections going from several sensors may also be split to associate each one with several adjacent traces.

BRIEF DESCRIPTION OF THE DRAWINGS

Other features and advantages of the invention will be clear from reading the description hereafter of embodiments given by way of non limitative example, with reference to the accompanying drawings in which.

DESCRIPTION OF THE PREFERRED EMBODIMENTS

Figure 1:
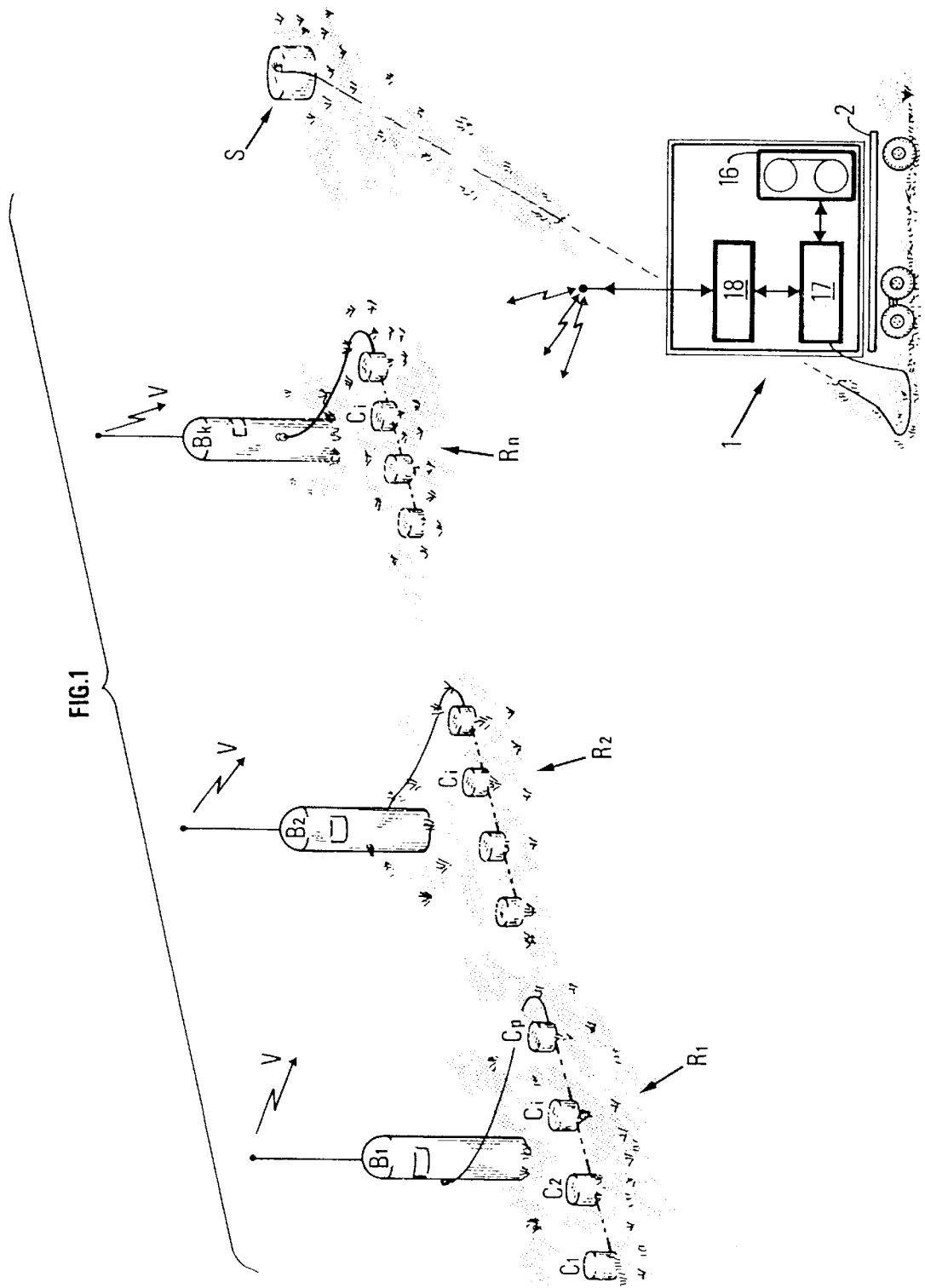
FIG. 1 shows a seismic exploration device arranged in a zone to be explored.
Figure 2:
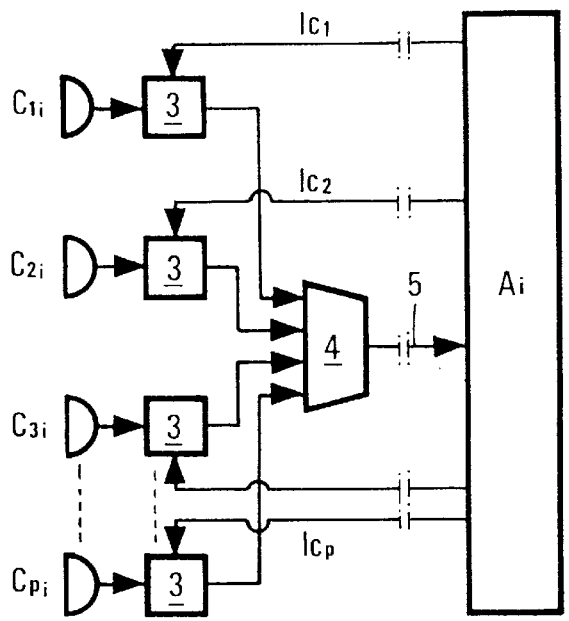
FIG. 2 diagrammatically shows a first embodiment of the invention with an individual link between each adjusting means and the associated acquisition apparatus.
Figure 4:
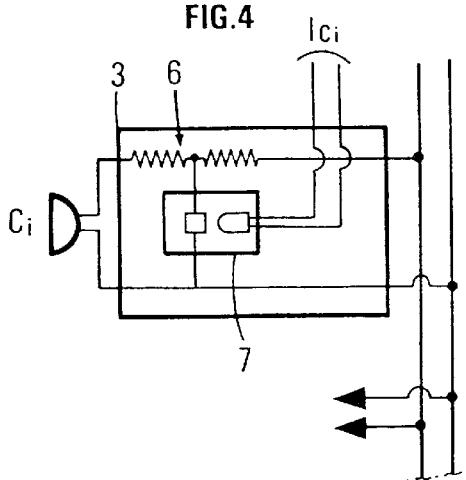
FIG. 4 diagrammatically shows a first embodiment of an adjusting element of opto-electronic type associated with a seismic sensor.
Figure 3:
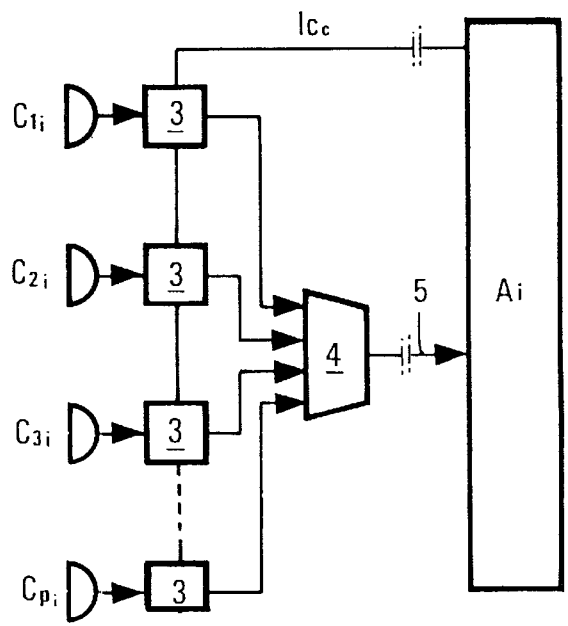
FIG. 3 diagrammatically shows a second embodiment of the invention with an addressable link between the adjusting means and the associated acquisition apparatus.
Figure 5:
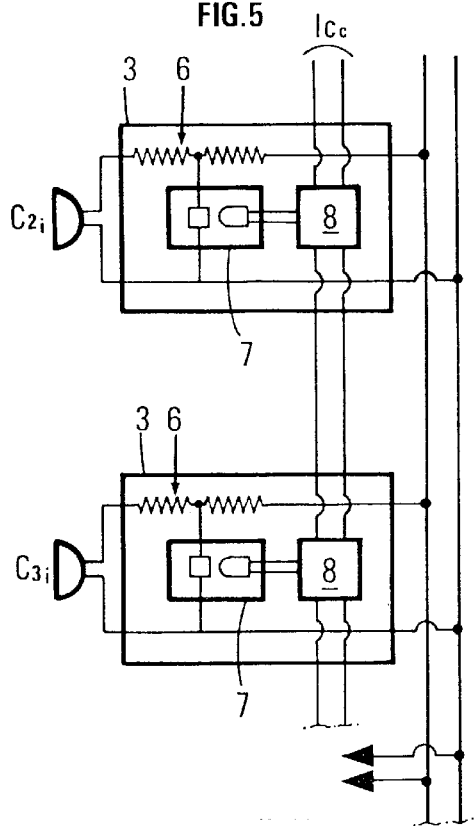
FIG. 5 shows a variant of the previous embodiment with addressable adjusting elements.

With reference to FIG. 1 onshore seismic exploration system generally comprises a source of acoustic waves S and a seismic reception and acquisition apparatus comprising a large number of seismic receivers R1, R2, . . . , Rn which are distributed in the field, and a central control and recording station 1 installed in a vehicle 2 to control the triggering of the source S and to centralize the seismic data picked up by the various sensors R1 to Rn. Each seismic receiver Ri is connected individually to the central station 1 or preferably to a box B1, B2, . . . , Bk containing a data acquisition apparatus for collecting the signals produced by one or several receivers and, by order of central station 1, to transmit them thereto through a communication channel V such as a linking cable or a radio link. Various exploration devices utilizing acquisition apparatus communicating with a central station by radio and/or by cable are described in U.S. Pat. Nos. 4,583,206; 4,815,044 and 4,908,803 assigned to the same assignee.

In prior seismic reception devices, each seismic receiver generally comprises several elementary sensors C1, C2, . . . , Cp interconnected electrically so that the resulting signal or seismic trace is the average of several elementary signals having possibly predetermined weightings which are difficult to modify.

According to the embodiments of FIGS. 2 to 5, the device in accordance with the invention comprises seismic traces that may be configured at will, for example, from the central station.

To that end, the elementary sensors C1 to Cp of a single seismic receiver R1 . . . Rn are associated (FIGS. 2, 3) with local processing circuits arranged to produce defined combinations of the signals produced by several elementary sensors, several examples of which will be given below. Several lay-outs are possible. Each elementary sensor $C1i$, $C2i$, $C3i$ . . . $Cpi$ is associated with an adjusting element 3 for processing the individual signals picked up. The outputs of the various adjusting elements 3 are connected to inputs of a combining element 4, such as a stacking device for example. The output of combination element 4 is connected to an input of an acquisition apparatus Ai in a local box B1, B2, etc, through a common line 5. According to the embodiment of FIG. 2, each adjusting element 3 is controlled individually through a line lc1, lc2 . . . lcp connecting it to the associated acquisition apparatus Ai. According to the variant of FIG. 3, the inputs controlling the various adjusting elements 3 are all connected to a common line linked to acquisition apparatus Ai. In this case, the adjusting elements 3 are all addressable. The commands addressed to one of the interconnected elements are emitted on the common line lcc (FIG. 3) associated with a destination address, and each one of them is provided with an address decoder (not shown).

Each adjusting element 3 may comprise for example (FIGS. 4, 5) a resistive bridge 6 one branch of which comprises a variable resistance 7 consisting of a photoresistance associated with a photo-emitter connected to the local acquisition apparatus through particular conductors lci. The application, to the conductors lci, of a variable electric current allows the voltage delivered by sensor Ci to be varied and possibly cancelled for some applications. The photo-emitter of each adjusting element may also be controlled (FIG. 5) by means of an address decoder 8. All the address decoders 8 associated with the sensors $C1i$–$Cpi$ of a single receiver Ri are interconnected on a control line $lc_c$ linked with the local acquisition apparatus. Application of a particular command intended for one of the adjusting elements 3 is transmitted by associating the address of the decoder 8 concerned therewith.

In the embodiments described, control of the adjusting elements 3 is achieved, for example, from the central. In order to act upon any adjusting element 3, address words designating specifically the local acquisition box and the associated adjusting element are associated with the control. The message is transmitted through the transmission channel V used (cable or channel) to the acquisition apparatus. The message is directed towards the particular control conductors lci of the adjusting element 3 (FIG. 4) or towards the common control line lcc (FIG. 5) where it is intercepted by the local decoder 8 at the specified address.

The central control and recording station 1 principally comprises a recorder 16, a control set 17 programmed to manage the seismic recording cycles and to work out the controls of the various adjusting elements 3 associated with the various receivers Ri in the field, and a communication set 18 for the communication channel linking the central station 1 to the various acquisition boxes.

Numerous examples of use of the invention will be given hereafter to show the large variety of seismic data processings which may be achieved from the central station by operators.

With the invention as described, many complex operations, well-known to geophysicists, may be carried out.

Within the scope of a multi-channel filtering, it is for example possible to:

- select through all or nothing the sensors whose elementary signals are combined to form the various traces,
- choose at will the particular attenuation coefficients to be applied to the signals of each sensor,
- apply selected delays to the various signals before the combining thereof,
- mark out at will each trace through particular gain and delay values,
- vary the gain or attenuation values, as well as the delays applied during each recording time, a
- subtract a noise model, etc.

Within the scope of a single-channel filtering, a frequency filtering known as convolutional or other more complex filterings, such as recursive filtering, may also be performed.

Thus, the filtering mode known as trace filtering may be optimized and applied in a particular way at any point of the space of co-ordinates (x,t) in order to better save the characteristics of the signals.

The method according to the invention allows development procedures to be highly simplified. In surface seismic prospecting, a plurality of noise "shootings" may be performed by selecting each time a single sensor per trace, so as to determine, by means of a seismic laboratory computer, the trace filtering parameters and then, with the values found for these filtering parameters, to achieve a development shooting. Noise shootings and development shootings may be performed with the same sensors. This is not the case usually, insofar as the sensors used for noise measurement and those used for development are generally not the same. The sensors must therefore be changed while trying to keep the previous positioning of the noise sensor. As it is well-known, this sensor change is the cause of mistakes in the noise parameters.

The simplification provided by the remotely controllable means for adjusting the weightings makes it however possible to perform a noise filtering without any previous noise shootings. In the case of vectorial sensors with several reception axes, allowing the polarization of the signals received to be determined, is available, and trace filtering may also be made more efficient by utilizing the polarization data in order to characterize better the useful signals and the noise to be suppressed.

The possibility, given to field operators, of configuring the receivers is also very useful in the field of well seismic prospecting where the guided waves or Stoneley waves, whose amplitude is much higher than that of the useful signals, have to be minimized. Once the characteristics of the noise to be suppressed has been measured, it is possible to obtain, through an action on the adjusting means, a very efficient filtering before recording, and thus to keep all the digitization dynamics for the useful signals. When 3D seismic prospecting operations are carried out with sensors distributed regularly over a surface and a source which is displaced successively in many points of the surface, it is well-known that the noise propagation directions vary with the displacement of the source. With the remotely controllable adjusting being used, the optimum filtering direction may be easily adjusted for each trace so as to take account of the changes in the noise propagation. For some applications, the traces are stretched by increasing the distance between the sensors so that adjacent traces may overlap slightly. In this case, one is led to position sensors substantially in the same place on the ground, each one of them being linked to a different trace. With the signal modelling means described, the signals of a single sensor may be combined with those of two different traces, on condition that connections allowing these signals to be transferred from one to the other are provided. It is possible, in this case, to decrease the total number of necessary sensors without any filtering efficiency loss.

The examples given above are in no way limitative,

Without departing from the scope of the invention, adjusting elements remote controllable from the central station and combined with a conventional reception device where the receivers are all connected directly to the control and recording station, and not by means of local acquisition apparatuses, may be used.

What is claimed is:

1. A seismic exploration system comprising:
   an array of seismic receivers, each seismic receiver producing a seismic trace with the array including at least one group of seismic receivers;
   each seismic receiver including a set of a plurality of seismic sensors, with each seismic sensor producing a seismic signal;
   a controlled element, coupled to each of the seismic sensors, for modifying the seismic signal produced by each seismic sensor;
   at least one combining element, each combining element being coupled to an output of each of a plurality of the controlled elements coupled to one of the plurality of sets of seismic sensors for combining the seismic signals to produce at least one seismic trace or to modify which seismic signals are combined to produce each seismic trace; and
   a control, coupled to each controlled element, for controlling the modifying or combining of the seismic signal produced by at least one set of a plurality of seismic sensors in response to commands received by control; and
   a station, coupled to the seismic receivers, for collecting and recording seismic traces produced by the seismic receivers and producing and transmitting the commands to the control.

2. A seismic exploration system in accordance with claim 1 wherein:
   the station also controls the controlled elements by transmitting control signals to the control to control the modification of the seismic signals produced by a seismic sensor.

3. A seismic exploration system in accordance with claim 1 further comprising:
   means for connecting a seismic sensor to a controlled element in a plurality of the sets of seismic sensors.

4. A seismic exploration system in accordance with claim 1 further comprising:
 a data acquisition apparatus disposed in a zone to be seismically explored for collecting the seismic trace from at least one receiver with the control of at least one set of seismic sensors being disposed in the data acquisition apparatus, a communication channel connecting the data acquisition apparatus to the station for transmitting control data and the seismic traces on the channel and an electrical conductor coupling the control to each of the controlled elements.

5. A seismic exploration system in accordance with claim 3 further comprising:
 a data acquisition apparatus disposed in a zone to be seismically explored for collecting the seismic trace from at least one receiver with the control of at least one set of seismic sensors being disposed in the data acquisition apparatus, a communication channel connecting the data acquisition apparatus to the station for transmitting control data and the seismic traces on the channel and an electrical conductor coupling the control to each of the controlled elements.

6. A seismic exploration system in accordance with claim 1 wherein:
 the controlled elements comprise photo emitters for modifying the seismic signal produced by the seismic sensor coupled thereto; and further comprising
 a conductive path coupling the control to the controlled elements.

7. A seismic exploration system in accordance with claim 3 wherein:
 the controlled elements comprise photo emitters for modifying the seismic signal produced by the seismic sensor coupled thereo; and further comprising
 a conductive path coupling the control to the controlled elements.

8. A seismic exploration system as recited in claim 6 wherein:
 the control comprises means for associating an address with a command to be applied to one of the controlled elements; and
 the controlled elements comprise an address decoder.

9. A seismic exploration system as recited in claim 7 wherein:
 the control comprises means for associating an address with a command to be applied to one of the controlled elements; and
 the controlled elements comprise an address decoder.

10. A seismic exploration system as recited in claim 6 wherein:
 the conductive path comprises a pair of conductive wires.

11. A seismic exploration system as recited in claim 7 wherein:
 the conductive path comprises a pair of conductive wires.

12. A seismic exploration system as recited in claim 1 further comprising:
 a plurality of the seismic sensors are coupled to a plurality of receivers with electrical conductors.

13. A seismic exploration system as recited in claim 2 further comprising:
 a plurality of the seismic sensors are coupled to a plurality of receivers with electrical conductors.

14. A method of seismic exploration comprising:
 installing an array of seismic receivers in a zone to be explored with each receiver including a plurality of seismic sensors with each seismic sensor producing a received seismic signal and each receiver combining a plurality of received seismic signals to produce a seismic trace;
 installing a source of seismic signals in the zone;
 providing at least one recording and control station for recording seismic traces received from the seismic receivers;
 producing seismic signals coupled to the zone to be explored by activating the source of seismic signals;
 sensing a plurality of the received seismic signals in response to the activation of the source of seismic signals with the plurality of seismic sensors of each of the plurality of receivers;
 producing a plurality of seismic traces, each seismic trace being produced with a seismic receiver by combining a selected group of received seismic signals; and wherein
 the combining of each selected group of received seismic signals to produce each of the seismic traces is controlled by transmission of control signals from the recording and control station to a plurality of controlled elements to modify each selected group to change the received seismic signals in each selected group or to modify which of the received seismic signals in each selected group are combined to produce each seismic trace.

15. A method as recited in claim 14 further comprising:
 controlling an amplitude of individual received seismic signals which are combined to produce at least one seismic trace.

16. A method as recited in claim 14 wherein:
 the modification of the received seismic signals comprises transmitting at least one of the control signals to select a phase shift of at least one of the received seismic signals produced by the plurality of seismic sensors.

17. A method as recited in claim 14 further comprising:
 transmitting at least one of the control signals to select a number of the plurality of received seismic signals which are combined to form a seismic trace.

18. A method as recited in claim 14 further comprising:
 transmitting at least one of the control signals to select a combination of received seismic signals to be combined to form a seismic trace.

19. A method as recited in claim 18 wherein:
 the at least one of the control signals selects the combination of received seismic signals to produce convolutional filtering.

20. A method as recited in claim 18 wherein:
 the at least one of the control signals selects the combination of received seismic signals to produce recursive filtering.

21. A method in accordance with claim 18 wherein:
 the at least one of the control signals selects the combination of received seismic signals to include a received seismic signal from at least one sensor in a plurality of different seismic traces.

22. A method in accordance with claim 14 wherein:
 the combining of at least one selected group to produce at least one seismic trace is varied by the transmission of at least one control signal to at least one of the seismic receivers to vary at least one of the selected group over time.

* * * * *